Patented Sept. 19, 1922.

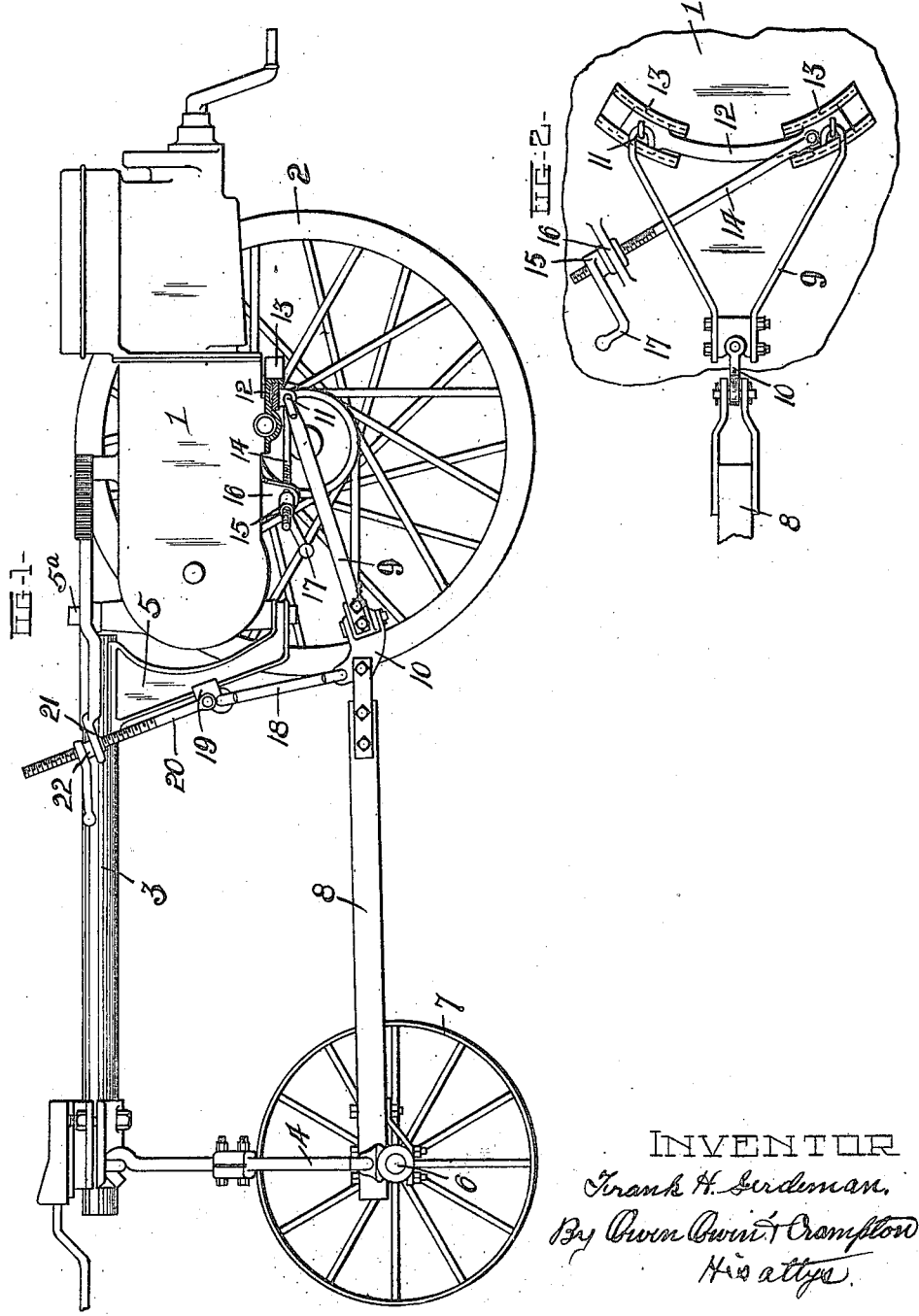

1,429,729

UNITED STATES PATENT OFFICE.

FRANK H. GERDEMAN, OF FINDLAY, OHIO.

ADJUSTABLE DRAFT MEANS.

Application filed December 11, 1920. Serial No. 429,851.

*To all whom it may concern:*

Be it known that I, FRANK H. GERDEMAN, a citizen of the United States, and a resident of Findlay, in the county of Hancock and State of Ohio, have made an invention appertaining to Adjustable Draft Means; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to draft appliances particularly intended for use in connection with tractors, and has for an object thereof the provision of a simple and efficient appliance of this character, which is capable of vertical adjustment relative to the tractor to suit the height of draft desired to be applied to the attached appliance and the work to be performed. This application, with respect to this feature, is filed as a continuation of my copending application Serial No. 350,839, filed January 12, 1920.

A further object of my invention is the provision in connection with a draft appliance of the class described, of means for effecting an easy and rapid adjustment of the draft means laterally of the center line of draft of the tractor, so that the line of draft on the trailing appliance may be positioned at one side or the other of a row over which it may be operating.

The invention is fully described in the following specification, and while, in its broader aspect, it is capable of embodiment in numerous forms, a preferred embodiment thereof is illustrated in the accompanying drawings, in which,—

Fig. 1 is a side elevation of a tractor and trailing appliance connected together by my adjustable draft means, parts of the tractor being removed and parts in section, and Fig. 2 is a fragmentary bottom view of the tractor and the draft means attached thereto.

Referring to the drawings, 1 designates the body frame of a tractor and 2 a supporting wheel therefor, one of which is disposed at each side of the tractor. A beam 3 projects rearwardly from the upper portion of the tractor body 1 for horizontal swinging movements relative thereto, being pivoted for such movement, and having its rear end supported above the apparatus to be drawn by rods 4, as more fully disclosed in my said former application. The forward end of the beam 3 is provided with a yoke 5, the arms of which are vertically spaced and pivoted to the tractor body at 5ª.

The apparatus to be drawn by the tractor is illustrated, in the present instance, by a truck, which comprises the axle 6, wheels 7 at the ends of the axle, and tongue 8 projecting forward from the axle centrally thereof. The tongue 8 is attached at its forward end for vertical pivotal movements to the rear end of a draft yoke 9 through the medium of a clevis member 10. The yoke 9 is of forked form, having its arms projecting forward and outward in divergent relation from the central point of attachment of the tongue 8 thereto, and each arm is pivotally connected for vertical swinging movements, as shown at 11, to opposite ends of a segmental cross-bar 12, the axis of which is disposed forward thereof. The ends of the cross-bar 12 are mounted for arcuate reciprocatory movements transversely of the tractor body 1 in segmental guides 13 formed or provided on the under side of the tractor body. The cross-bar 12 has a rod 14 projecting from one end thereof transversely and rearwardly of the tractor, and this rod has a nut 15 threaded on its outer end and in rotary engagement with a perforated ear 16 on the tractor body whereby a turning of the nut will impart longitudinal movement in one direction or the other to the rod 14 and a consequent adjustment to the cross-bar 12. The nut 15, to facilitate a turning thereof, is provided with a crank arm 17. It is thus evident that the draft yoke 9 may be shifted in a swinging manner transversely of the tractor body so as to dispose the line of draft on the attached tongue 8 at one side or the other of the center line of draft of the tractor.

A swinging suspending link or member 18 connects the clevis 10 to a slide block 19 that is guided for vertical sliding movements by the downwardly projecting arm of the yoke 5. The block 19 is carried by a rod 20, which projects up through a guide ear 21 on the yoke 5 and has an adjusting nut 22 threaded thereon and mounted for rotary but not axial movements in the ear 21. It is thus evident that a turning of the nut 22 on the rod 20 will effect a vertical adjustment of the block 19, link 18 and rear end of the draft yoke 9 to suit the height of draft desired to be applied to the tongue 8 by the draft yoke.

The adjustment which I have provided for the draft yoke and connected tongue to the attached truck, implement, or the like, is an important feature, as it enables the line of draft to be varied, as desired, to suit the work to be performed, or to adapt it for the apparatus to which attached. The permissible vertical adjustment of the draft yoke 9 is important, for in cultivating corn or other high plants it becomes necessary to have a high clearance, and this can be accomplished by simply turning the nut 22 the desired extent. The permissible horizontal adjustment of the draft yoke is also important as it enables the line of draft to be shifted to one side or the other of a row over which the tractor is traveling so that an attached plow, cultivator blade, or other attached tool, may be positioned to act on either side of the row and the direct line of draft thereto from the tractor adjusted accordingly.

I wish it understood that my invention is not limited to any specific construction, arrangement, or form of the parts, as it is capable of numerous modifications and changes, without departing from the spirit of the claims.

Having thus described my invention, what I claim as new and desire to secure by Letters Patent, is,—

1. In combination, a tractor, an arcuate member secured thereto for longitudinal arcuate adjustment transverse to the tractor, means operable to adjust said member, and a draft member pivotally trailing from the adjustable member and having its line of draft shifted by an adjustment of the first member.

2. In combination, a tractor, an arcuate bar carried by the tractor at the under side of its body portion for transverse arcuate adjustment relative thereto, means operable to adjust the bar, a draft member trailing from the bar for vertical pivotal movements relative thereto and having its line of draft adjusted by an adjustment of the bar, and means adjustably supporting the rear end of the draft member.

3. In combination, a tractor, a draft member trailing therefrom for vertical pivotal movements, a vertically movable element above the rear end of the draft member, a guide for the element, connection between the element and member to cause a vertical adjustment of one with the other, and means connected to the element and operable to adjust the vertical position thereof.

4. The combination with a tractor, of a segmental cross bar carried thereby for transverse arcuate adjusting movements with the center point of the arc in advance of the bar, a draft yoke trailing from the bar for vertical swinging movements, means operable to impart adjusting movements to the bar to laterally shift the line of applied draft of the yoke member, and means supporting the rear end of the yoke for vertical adjustment and for permissible lateral swinging movements.

In testimony whereof I have hereunto signed my name to this specification.

FRANK H. GERDEMAN.